(12) United States Patent
Hattori et al.

(10) Patent No.: US 7,244,287 B2
(45) Date of Patent: *Jul. 17, 2007

(54) MAGNETIC PARTICLE, ITS PRODUCTION METHOD, MAGNETIC RECORDING MEDIUM AND ITS PRODUCTION METHOD

(75) Inventors: Yasushi Hattori, Kanagawa (JP); Koukichi Waki, Kanagawa (JP); Keizo Ogawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/895,938

(22) Filed: Jul. 22, 2004

(65) Prior Publication Data

US 2004/0261905 A1 Dec. 30, 2004

Related U.S. Application Data

(62) Division of application No. 10/448,435, filed on May 30, 2003.

(30) Foreign Application Priority Data

May 31, 2002 (JP) .............................. 2002-159906
Apr. 16, 2003 (JP) .............................. 2003-111379

(51) Int. Cl.
*C22B 1/16* (2006.01)

(52) U.S. Cl. .............................. 75/351; 75/769; 419/30

(58) Field of Classification Search .................. 75/348, 75/230, 232, 763, 351, 769; 420/497, 590; 419/30

See application file for complete search history.

(56) References Cited

U.S. PATENT DOCUMENTS

| | | | |
|---|---|---|---|
| 3,622,409 A * | 11/1971 | McCunn ..................... 148/122 |
| 4,093,453 A * | 6/1978 | Makino et al. ............. 148/527 |
| 4,406,694 A * | 9/1983 | Mishima et al. ................ 420/8 |
| 5,252,367 A | 10/1993 | Sato et al. |
| 5,325,351 A * | 6/1994 | Uchiyama et al. ........ 369/275.1 |
| 5,735,969 A * | 4/1998 | Lown et al. ................ 148/105 |
| 6,007,623 A * | 12/1999 | Thiele et al. .................. 117/95 |
| 6,086,974 A * | 7/2000 | Thiele et al. ............... 428/65.3 |
| 6,171,410 B1 * | 1/2001 | Kojima et al. .............. 148/302 |
| 6,331,364 B1 * | 12/2001 | Baglin et al. ............ 428/694 T |
| 6,368,685 B1 | 4/2002 | Schwarz et al. |
| 6,372,302 B1 | 4/2002 | Kurose et al. |
| 6,641,934 B1 | 11/2003 | Suzuki et al. |
| 6,696,183 B2 | 2/2004 | Onodera et al. |
| 6,878,445 B2 * | 4/2005 | Hattori et al. .............. 428/402 |
| 6,884,328 B2 | 4/2005 | Litvinov et al. |
| 6,994,895 B2 * | 2/2006 | Hattori et al. .............. 427/599 |
| 7,037,605 B2 * | 5/2006 | Hattori et al. .............. 428/827 |
| 2002/0041980 A1 | 4/2002 | Suzuki et al. |
| 2002/0086185 A1 * | 7/2002 | Yasui et al. ............ 428/694 TS |
| 2002/0098381 A1 * | 7/2002 | Coffey et al. ............ 428/694 T |
| 2003/0059604 A1 | 3/2003 | Hattori et al. |
| 2004/0005458 A1 * | 1/2004 | Hattori et al. .............. 428/402 |
| 2004/0033357 A1 | 2/2004 | Hattori et al. |
| 2004/0071923 A1 * | 4/2004 | Fullerton et al. .......... 428/65.3 |
| 2004/0137276 A1 * | 7/2004 | Hattori et al. .......... 428/694 B |

FOREIGN PATENT DOCUMENTS

| | | |
|---|---|---|
| CA | 1042278 | 11/1978 |
| DE | 24 61 201 A1 | 10/1975 |
| DE | 25 55 826 A1 | 6/1976 |
| DE | 197 07 754 A1 | 9/1997 |
| EP | 1376625 A2 | 1/2004 |
| JP | 56-153532 A | 11/1981 |
| JP | 3-169001 | 7/1991 |
| JP | 2001-101645 A | 4/2001 |
| JP | 2001-256631 | 9/2001 |
| JP | 2002-157727 A | 5/2002 |
| JP | 2003-073705 A | 3/2003 |
| JP | 2003-113401 A | 4/2003 |

OTHER PUBLICATIONS

Sun et al., *Monodisperse FePt nanoparticles and Ferromagnetic FePt Nanocrystal Superlattices*, Science vol. 287, pp. 1989-1992 (2000).

* cited by examiner

*Primary Examiner*—H. Thi Le
(74) *Attorney, Agent, or Firm*—Sughrue Mion, PLLC

(57) ABSTRACT

The present invention relates to a method of producing a magnetic particle including forming a layer containing an alloy particle that can form a CuAu-type or $Cu_3Au$-type hard magnetic ordered alloy phase on a support, oxidizing the layer, and annealing the layer in a non-oxidizing atmosphere. The invention also relates to a method of producing a magnetic particle including producing an alloy particle that can form a hard magnetic ordered alloy phase, oxidizing the alloy particle, and annealing the particle in a non-oxidizing atmosphere, and a magnetic particle produced by the foregoing production method. Further, the invention relates to a magnetic recording medium comprising a magnetic layer containing a magnetic particle and a method of producing a magnetic recording medium including forming a layer containing an alloy that can form the foregoing hard magnetic ordered alloy phase, oxidizing the layer, and annealing the layer in a non-oxidizing atmosphere.

5 Claims, No Drawings

MAGNETIC PARTICLE, ITS PRODUCTION METHOD, MAGNETIC RECORDING MEDIUM AND ITS PRODUCTION METHOD

This is a Divisional of application Ser. No. 10/448,435 filed May 30, 2003.

BACKGROUND OF THE INVENTION

1. Field of the Invention

The present invention relates to a magnetic particle and a production method thereof, as well as a magnetic recording medium containing the magnetic particles in a magnetic layer and a production method thereof.

2. Description of the Related Art

In order to increase magnetic recording density, the size of magnetic particles contained in a magnetic layer needs to be reduced. For example, when magnetic recording media widely used in the form of a videotape, a computer tape, a disk or the like contain ferromagnetic substance of equal weight, a reduction in particles size of the ferromagnetic substance will reduce the level of noise.

A material for magnetic particles which is effective in improving magnetic recording density can be a CuAu-type or $Cu_3Au$-type hard magnetic ordered alloy (e.g. refer to Japanese Patent Application Laid-Open (JP-A) No. 2003-73705). The hard magnetic ordered alloy is known to have high crystal magnetic anisotropy due to strains occurring in an ordering process, and displays hard magnetism even when the size of magnetic particles is made small.

Magnetic particles displaying hard magnetism can be produced by a liquid-phase method and a vapor-phase method, and magnetic particles produced immediately after a liquid-phase method have a disordered phase and a face-centered cubic lattice structure.

This face-centered cubic lattice generally indicates soft magnetism or paramagnetism. Magnetic particles having soft magnetism or paramagnetism are not suitable for use in recording media. In order to obtain a hard magnetic ordered alloy with a coercive force of 95.5 kA/m (1,200 Oe), required for a magnetic recording medium, it is necessary to carry out annealing at a temperature not lower than a transformation temperature at which a disordered phase is transformed to an ordered phase.

When the above-mentioned magnetic particles are produced by a liquid-phase method, in order to prevent the metal of the magnetic particles from being oxidized, it is necessary to anneal the magnetic particles in a non-oxidizing atmosphere such as Ar, or $N_2$. According to experiments performed by the inventors of the present invention, when an alloy phase is ordered by annealing, the transformation temperature may become high. The rise in transformation temperature is problematic from the viewpoints of heat resistance of a substrate, production facilities, and reproducibility of magnetic characteristics of the resultant magnetic recording medium.

SUMMARY OF THE INVENTION

As described above, an object of the present invention is to provide a method of producing a magnetic particle with hard magnetism without increasing the annealing temperature, and a magnetic particle produced by the production method.

Furthermore, an object of the invention is to provide a magnetic recording medium having a magnetic layer including the foregoing magnetic particles and the production method thereof.

As a result of earnest investigations to solve the above-mentioned problems, the inventors of the present invention have found that the above-mentioned objects can be achieved by the following invention. That is:

A first aspect of the invention is a method (A1) of producing a magnetic particle including forming on a support a layer containing alloy particles that can form a CuAu-type or $Cu_3Au$-type hard magnetic ordered alloy phase, oxidizing the layer, and annealing the layer in a non-oxidizing atmosphere.

A second aspect of the invention is the method (A1) of producing a magnetic particle, wherein the atmosphere for the annealing is a reducing atmosphere, an annealing temperature is 450° C. or lower, and a retention time is 10 minutes or shorter.

A third aspect of the invention is the method (A1) of producing a magnetic particle, wherein a third element other than elements that can form the CuAu-type or $Cu_3Au$-type hard magnetic ordered alloy phase, is added to the alloy particle as an alloying element.

A fourth aspect of the invention is a method (A2) of producing a magnetic particle including producing an alloy particle that can form a CuAu-type or $Cu_3Au$-type hard magnetic ordered alloy phase, oxidizing the alloy particle, and annealing the particle in a non-oxidizing atmosphere.

A fifth aspect of the invention is the method (A2) of producing a magnetic particle, wherein the atmosphere for the annealing is a reducing atmosphere, an annealing temperature is 450° C. or lower, and a retention time is 10 minutes or shorter.

A sixth aspect of the invention is the method (A2) of producing a magnetic particle, wherein a third element other than elements that can form the CuAu-type or $Cu_3Au$-type hard magnetic ordered alloy phase, is added to the alloy particle as an alloying element.

A seventh aspect of the invention is a magnetic particle (A3) produced by a method including forming on a support a layer containing alloy particles that can form a CuAu-type or $Cu_3Au$-type hard magnetic ordered alloy phase, oxidizing the layer, and annealing the layer in a non-oxidizing atmosphere.

An eighth aspect of the invention is the magnetic particle (A3), wherein the atmosphere for the annealing is a reducing atmosphere, an annealing temperature is 450° C. or lower, and a retention time is 10 minutes or shorter.

A ninth aspect of the invention is the magnetic particle (A3), wherein a third element other than elements that can form the CuAu-type or $Cu_3Au$-type hard magnetic ordered alloy phase, is added to the alloy particles as an alloying element.

A tenth aspect of the invention is a magnetic particle (A4) produced by a method including producing an alloy particle that can form a CuAu-type or $Cu_3Au$-type hard magnetic ordered alloy phase, oxidizing the alloy particle, and annealing the particle in a non-oxidizing atmosphere.

An eleventh aspect of the invention is the magnetic particle (A4), wherein the atmosphere for the annealing is a reducing atmosphere, an annealing temperature is 450° C. or lower, and a retention time is 10 minutes or shorter.

A twelfth aspect of the invention is the magnetic particle (A4), wherein a third element other than elements that can form the CuAu-type or $Cu_3Au$-type hard magnetic ordered alloy phase, is added to the alloy particle as an alloying element.

A thirteenth aspect of the invention is a magnetic recording medium (A5) comprising a magnetic layer containing magnetic particles produced by a method including forming on a support a layer containing alloy particles that can form a CuAu-type or $Cu_3Au$-type hard magnetic ordered alloy phase, oxidizing the layer, and annealing the layer in a non-oxidizing atmosphere.

A fourteenth aspect of the invention is the magnetic recording medium (A5), wherein the atmosphere for the annealing is a reducing atmosphere, an annealing temperature is 450° C. or lower, and a retention time is 10 minutes or shorter.

A fifteenth aspect of the invention is the magnetic recording medium (A5), wherein a third element other than elements that can form the CuAu-type or $Cu_3Au$-type hard magnetic ordered alloy phase, is added to the alloy particles as an alloying element.

A sixteenth aspect of the invention is a magnetic recording medium (A6) comprising a magnetic layer containing magnetic particles produced by a method including producing alloy particles that can form a CuAu-type or $Cu_3Au$-type hard magnetic ordered alloy phase, oxidizing the alloy particles, and annealing the particles in non-oxidizing atmosphere.

A seventeenth aspect of the invention is the magnetic recording medium (A6), wherein the atmosphere for the annealing is a reducing atmosphere, an annealing temperature is 450° C. or lower, and a retention time is 10 minutes or shorter.

An eighteenth aspect of the invention is the magnetic recording medium (A6), wherein a third element other than elements that can form the CuAu-type or $Cu_3Au$-type hard magnetic ordered alloy phase, is added to the alloy particles as an alloying element.

A nineteenth aspect of the invention is a method (A7) of producing a magnetic recording medium including forming on a support a layer containing an alloy that can form a CuAu-type or $Cu_3Au$-type hard magnetic ordered alloy phase, oxidizing the layer, and annealing the layer in a non-oxidizing atmosphere.

A twentieth aspect of the invention is the method (A7) of producing a magnetic recording medium, wherein the atmosphere for the annealing is a reducing atmosphere, an annealing temperature is 450° C. or lower, and a retention time is 10 minutes or shorter.

DETAILED DESCRIPTION OF THE INVENTION

<<Magnetic Particle and its Production Method>>

The first method of producing magnetic particles according to the present invention includes an alloy particle production step, in which alloy particles that can form hard magnetic ordered alloy phase are produced by a liquid phase method or a vapor phase method; an oxidation step, in which the produced alloy particles are oxidized; and an annealing step, in which the oxidized alloy particles are annealed in a non-oxidizing atmosphere.

Hereinafter, each step of the method of producing magnetic particles and the magnetic particle of the invention will be described.

<Alloy Particle Production Step>

Alloy particles that can be converted into magnetic particles by annealing can be produced by a vapor phase method or a liquid phase method. In consideration of suitability for mass production, the liquid phase method is preferable over the vapor phase method. The liquid phase method can be any of conventionally known methods, but is preferably a reducing method, in which a conventionally known method has been improved, and more preferably a reverse micelle method by which particle size can be easily controlled.

Reverse Micelle Method

The reverse micelle method includes at least (1) a reduction step in which reduction reaction is proceeded by mixing two types of reverse micelle solutions, and (2) an aging step in which the resultant system is aged at a prescribed temperature after the reduction.

Hereinafter, the respective steps will be described.

(1) Reduction Step:

First, a reverse micelle solution (I) is prepared by mixing a water-insoluble organic solvent containing a surfactant and an aqueous reducing agent solution.

As the surfactant, an oil-soluble surfactant is used. Specific examples thereof include sulfonate surfactants (e.g. Aerosol OT (produced by Wako Pure Chemical Industries, Ltd.), quaternary ammonium salt surfactants (e.g. cetyl trimethyl ammonium bromide), and ether surfactants (e.g. pentaethylene glycol dodecyl ether).

The amount of the surfactant included in the water-insoluble organic solvent is preferably 20 to 200 g/liter.

Preferable examples of the water-insoluble organic solvent which dissolves the surfactant include alkane, ether and alcohol.

The alkane preferably has 7 to 12 carbon atoms. Specific examples thereof include heptane, octane, iso-octane, nonane, decane, undecane, and dodecane.

The ether is preferably diethyl ether, dipropyl ether, or dibutyl ether.

The alcohol is preferably ethoxyethanol, or ethoxypropanol.

Examples of the reducing agent contained in the aqueous reducing agent solution include alcohols; polyalcohols; $H_2$; compounds containing HCHO, $S_2O_6^{-2}$, $H_2PO2^-$, $BH4^-$, $N_2H_5^+$, and $H_2PO_3^-$. One of these reducing agents can be used, or two or more of them may be used together.

The amount of the reducing agent in the aqueous solution is preferably 3 to 50 mole with respect to 1 mole of a metal salt.

Here, the mass ratio of water to the surfactant in the reverse micelle solution (I) is preferably 20 or lower. If the mass ratio exceeds 20, the component(s) tend to precipitate and the resultant particles tend to become uneven. The mass ratio is preferably 15 or lower, and more preferably 0.5 to 10.

Moreover, a reverse micelle solution (II) is separately prepared by mixing a water-insoluble organic solvent containing a surfactant and an aqueous metal salt solution.

The surfactant and the water-insoluble organic solvent and the concentration thereof are similar to those in the case of the reverse micelle solution (I).

The surfactant in the reverse micelle solution (II) may be the same as or different from that in the reverse micelle solution (I). Moreover, the water-insoluble organic solvent in the reverse micelle solution (II) may be the same as or different from that in the reverse micelle solution (I). Further, the mass ratio of water to the surfactant in the reverse micelle solution (II) may be within the same range as that for the mass ratio of water to the surfactant in the reverse micelle solution (I). The mass ratio of water to the surfactant in the reverse micelle solution (II) may be the same as or different from that in the reverse micelle solution (I).

The metal salts contained in the aqueous metal salt solution are preferably, properly selected so that magnetic particles to be produced can form a CuAu-type or $Cu_3Au$-type ferromagnetic ordered alloy.

Here, the CuAu-type ferromagnetic ordered alloy can be FeNi, FePd, FePt, CoPt, or CoAu and is preferably FePd, FePt, or CoPt.

The $Cu_3Au$-type ferromagnetic ordered alloy can be $Ni_3Fe$, $FePd_3$, $Fe_3Pt$, $FePt_3$, $CoPt_3$, $Ni_3Pt$, $CrPt_3$, $Ni_3Mn$ and is preferably $FePd_3$, $FePt_3$, $CoPt_3$, $Fe_3Pd$, $Fe_3Pt$, or $Co_3Pt$.

Specific examples of the metal salt include $H_2PtCl_6$, $K_2PtCl_4$, $Pt(CH_3COCHCOCH_3)_2$, $Na_2PdCl_4$, $Pd(OCOCH_3)_2$, $PdCl_2$, $Pd(CH_3COCHCOCH_3)_2$, $HAuCl_4$, $Fe_2(SO_4)_3$, $Fe(NO_3)_3$, $(NH_4)_3Fe(C_2H_4)_3$, $Fe(CH_3COCHCOCH_3)_3$, $NiSO_4$, $CoCl_2$, and $Co(OCOCH_3)_2$.

The concentration of the metal salt in the aqueous metal salt solution is preferably 0.1 to 1,000 µmol/ml, and more preferably 1 to 100 µmol/ml.

Proper selection of metal salts makes it possible to produce alloy particles that can form a CuAu-type or $Cu_3Au$-type ferromagnetic ordered alloy in which a base metal is alloyed with a noble metal.

Annealing is necessary to transform the alloy phase of the alloy particles from a disordered phase to an ordered phase. However, in order to lower the transformation temperature, it is preferable to add a third element such as Sb, Pb, Bi, Cu, Ag, Zn, and In to the binary alloy. It is preferable to add in advance a precursor of the third element to the metal salt solution. The addition amount of the third element is preferably 1 to 30 at %, and more preferably 5 to 20 at % with respect to the binary alloy.

The reverse micelle solutions (I) and (II) thus prepared are mixed. The mixing method is not particularly limited. However, taking uniformity of reduction into consideration, it is preferable to carry out mixing by adding the reverse micelle solution (II) to the reverse micelle solution (I), which is being stirred. After completion of the mixing, reduction reaction is made to proceed. The temperature at this time is preferably constant within a range of −5 to 30° C.

If the reduction temperature is lower than −5° C., the water phase freezes, causing uneven reduction reaction. If it exceeds 30° C., the component(s) of the reaction system easily flocculates or precipitates and the reaction system becomes unstable in some cases. The reduction temperature is preferably 0 to 25° C., and more preferably 5 to 25° C.

Here, the above-mentioned "constant temperature" means that, when the set temperature is T° C., the actual temperature is within a range of T±3° C. The upper limit and the lower limit of the reduction temperature are still within the above-mentioned range (−5 to 30° C.).

The reduction time should be properly set depending on the amounts of the reverse micelle solutions and is preferably 1 to 30 minutes, and more preferably 5 to 20 minutes.

The reduction is preferably carried out while the system is being stirred at a speed as high as possible. This is because the process of the reduction significantly affects monodispersion in the particle size distribution.

A stirring apparatus is preferably a stirring apparatus having a high shearing force. Specifically, the stirring apparatus is one which includes stirring blades basically having a turbine type or a paddle type structure and rotated by a motor and which further includes a sharp edge attached to the end of each blade or disposed at a position contacting the stirring blade. Dissolver (manufactured by Tokushu Kika Kogyo Co., Ltd.), Omnimixer (manufactured by Yamato Scientific Co., Ltd.), and Homogenizer (manufactured by SMT) are useful as such. By employing these apparatuses, alloy particles having monodispersion distribution can be obtained in the form of a stable dispersion.

It is preferable to add at least one dispersant having 1 to 3 amino groups or carboxyl groups to at least one of the foregoing reverse micelle solutions (I) and (II) in an amount of 0.001 to 10 mole per mole of the alloy particles to be produced.

Addition of such a dispersant makes it possible to obtain flocculation-free alloy particles and having monodispersion distribution.

If the addition amount of the dispersant is less than 0.001 mole, the monodispersion property of the alloy particles cannot be improved in some cases. If it exceeds 10 mole, flocculation sometimes occurs.

The dispersant is preferably an organic compound having a group adhering to the surfaces of the alloy particles. Specific examples thereof include organic compounds having 1 to 3 groups selected from a group of amino groups, carboxyl groups, sulfonic acid groups, and sulfinic acid groups. One of these compounds may be used, or two or more of them can be used together.

The compound can be represented by a structural formula; R—$NH_2$, $NH_2$—R—$NH_2$, $NH_2$—R($NH_2$)—$NH_2$, R—COOH, COOH—R—COOH, COOH—R(COOH)—COOH, R—$SO_3H$, $SO_3H$—R—$SO_3H$, $SO_3H$—R($SO_3H$)—$SO_3H$, R—$SO_2H$, $SO_2H$—R—$SO_2H$, or $SO_2H$—R($SO_2H$)—$SO_2H$. R denotes a linear, branched or cyclic saturated or unsaturated hydrocarbon.

The dispersant is more preferably oleic acid. Oleic acid is a well-known surfactant for stabilizing colloids and has been used for protecting metal particles of such as iron. The relatively long chain of oleic acid [For example, oleic acid has a chain including 18 carbon atoms and having a length of about 20 Å (about 2 nm). Oleic acid is not an aliphatic compound but has one double bond] gives important steric hindrance canceling magnetic interaction between particles.

As in oleic acid, similar long chain carboxylic acids such as erucic acid, and linoleic acid (For example, one of long chain organic acids containing 8 to 22 carbon atoms can be used or two or more of them can be used together) can be used as the dispersant. However, oleic acid is an economical natural resource that is readily available (from olive oil or the like), and is therefore preferably used. As in oleic acid, oleylamine derived from oleic acid is also a useful dispersant.

In the reduction step described above, it is thought that a metal with a lower redox potential [metal with a redox potential of about −0.2 V (vs. N. H. E) or lower] such as Co, Fe, Ni, or Cr to be contained in the CuAu-type or $Cu_3Au$-type hard magnetic ordered alloy phase is reduced and precipitates in the form of monodisperse particles having a minimum size. Thereafter, in a temperature elevation step and an aging step to be described later, the precipitated base metal becomes a core and a metal with a higher redox potential [a metal with a redox potential of about −0.2 V (vs. N. H. E) or higher] such as Pt, Pd, or Rh is reduced by the base metal, on the surface of the base metal, and precipitates, replacing the base metal. It is presumed that the ionized base metal is reduced again by the reducing agent and precipitates. With such steps being repeated, alloy particles that can form a CuAu-type or $Cu_3Au$-type hard magnetic ordered alloy can be obtained.

(2) Aging Step:

After completion of the reduction, the solution after the reaction is heated to an aging temperature.

The aging temperature is preferably controlled at a constant temperature, which is higher than the reduction temperature and in the range of 30 to 90° C. The aging time is preferably 5 to 180 minutes. If the aging temperature is higher than the foregoing range or the aging time is longer than the foregoing range, flocculation and precipitation easily occur. On the contrary, if the temperature is lower than the foregoing range or the aging time is shorter than the foregoing range, the reaction cannot be completed and, as a result, the composition of the alloy changes. The aging temperature is preferably 40 to 80° C., and more preferably 40 to 70° C. The aging time is preferably 10 to 150 minutes, and more preferably 20 to 120 minutes.

Here, the foregoing "constant temperature" means the same as in a case of the reduction temperature (however, "the reduction temperature" is replaced with "the aging temperature"). In particular, it is preferable that the aging temperature be at least 5° C. higher than the reduction temperature, and be in the range of the foregoing aging temperature (30 to 90° C.). It is more preferable that the aging temperature be at least 10° C. higher than the reduction temperature, and be within the range. If the aging temperature is higher than the reduction temperature but the difference between the aging temperature and the reduction temperature is under 5° C., sometimes it becomes impossible to obtain a prescribed composition.

In the aging step as described above, a noble metal precipitates on the base metal reduced and precipitated in the reduction step.

That is, reduction of the noble metal takes place only on the base metal and the base metal and the noble metal do not separately precipitate. Thus, alloy particles that can form a CuAu-type or $Cu_3Au$-type hard magnetic ordered alloy having a prescribed composition ratio can be produced at a high yield, and the composition of the alloy can be adjusted to a desired composition. Also, by properly adjusting the stirring speed at the time of aging, the diameter of the alloy particles to be obtained can be adjusted to a desired diameter.

After the aging, washing and dispersing steps are preferably carried out, in which the solution after the aging is washed with a mixed solution of water and a primary alcohol, in which a primary alcohol is added to the solution to precipitate the resultant alloy particles, and in which the particles are dispersed in an organic solvent.

By performing the washing and dispersing steps, impurities are removed from the solution and the coating property at the time that a magnetic layer of a magnetic recording medium is formed by coating can be improved.

Each of the washing and dispersing steps may be carried out at least once, and preferably twice.

The primary alcohol employed in washing is not particularly limited, but is preferably methanol, or ethanol. The mixing ratio by volume of water to the primary alcohol is preferably in the range of 10/1 to 2/1, and more preferably in the range of 5/1 to 3/1.

If the proportion of water is high, it becomes difficult to remove the surfactant in some cases. On the contrary, if the proportion of the primary alcohol is high, flocculation sometimes occurs.

As described above, alloy particles dispersed in a solution (an alloy particle-containing solution) can be obtained.

The alloy particles have monodispersion distribution. Therefore, even if they are applied to a support, the alloy particles do not flocculate and maintain the uniformly dispersed state. Accordingly, even if annealing treatment is carried out, the particles do not flocculate and can be efficiently given hard magnetism and have excellent coating suitability.

The diameter of the alloy particles before oxidation, which will be described later, is preferably small in consideration of suppression of noise. However, if it is too small, the particles occasionally become superparamagnetic after annealing and become unsuitable for use in magnetic recording. The diameter of the alloy particles is preferably 1 to 100 nm, more preferably 1 to 20 nm, and still more preferably 3 to 10 nm.

Reduction Method

There are a variety of methods for producing alloy particles that can form a CuAu-type or $Cu_3Au$-type hard magnetic ordered alloy by reduction. A method is preferably conducted in which a metal with a lower redox potential (hereinafter, simply referred to as "a base metal" in some cases) and a metal with a higher redox potential (hereinafter, simply referred to as "a noble metal") are reduced with a reducing agent in an organic solvent, water, or a mixed solution of an organic solvent and water.

The sequence of reduction of the base metal and that of the noble metal is not particularly limited and the base and noble metals may be simultaneously reduced.

The organic solvent can be alcohol, or polyalcohol. The alcohol can be methanol, ethanol, or butanol. The polyalcohol can be ethylene glycol, or glycerin.

Examples of the CuAu-type or $Cu_3Au$-type hard magnetic ordered alloy are the same as those exemplified in the above-mentioned reverse micelle method.

Also, as a method for producing alloy particles by precipitating the noble metal before the base metal, a method disclosed in paragraphs 18 to 30 in Japanese Patent Application No. 2001-269255 can be employed.

The metal with a higher redox potential is preferably Pt, Pd, or Rh and $H_2PtCl_2.6H_2O$, $Pt(CH_3COCHCOCH_3)_2$, $RhCl_3.3H_2O$, $Pd(OCOCH_3)_2$, $PdCl_2$, or $Pd(CH_3COCHCOCH_3)_2$ can be used after being dissolved in a solvent. The concentration of the metal in a solution is preferably 0.1 to 1,000 μmol/ml, and more preferably 0.1 to 100 μmol/ml.

The metal with a lower redox potential is preferably Co, Fe, Ni, or Cr and more preferably Fe or Co. $FeSO_4.7H_2O$, $NiSO_4.7H_2O$, $CoCl_2.6H_2O$, or $Co(OCOCH_3)_2.4H_2O$ can be used after being dissolved in a solvent. The concentration of the metal in a solution is preferably 1 to 1,000 μmol/ml, and more preferably 0.1 to 100 μmol/ml.

Further, as in the reverse micelle method, a third element is preferably added to a binary alloy so as to lower a transformation temperature at which the alloy particles are transformed into the hard magnetic ordered alloy. The addition amount of the third element is the same as that in the case of the reverse micelle method.

For example, when a base metal and a noble metal are successively reduced in this order with a reducing agent, it is preferable to reduce these metals as follows. The base metal reduced with a reducing agent having a reduction potential lower than −0.2 V (vs. N.H.E), or the base metal reduced with the reducing agent and a part of the noble metal reduced with the reducing agent are added to a noble metal source. At least one metal contained in the resultant mixture is reduced with a reducing agent having a redox potential higher than −0.2 V (vs. N.H.E). Thereafter, at least one metal contained in the mixture is reduced with a reducing agent having a reduction potential lower than −0.2 V (vs. N.H.E).

Although the redox potential depends on the pH of the reaction system, as the reducing agent with a redox potential higher than −0.2 V (vs. N.H.E), alcohols such as 1,2-hexadecanediol; glycerin compounds; $H_2$; and HCHO are preferably used.

As the reducing agent with a redox potential lower than −0.2 V (vs. N.H.E), $S_2O_6^{2-}$, $H_2PO_2^-$, $BH_4^-$, $N_2H_5^+$, and $H_2PO_3^-$ are preferably used.

Here, when a metal compound having a valency of 0 such as Fe carbonyl is used as a raw material of the base metal, a reducing agent is not particularly required.

In reduction precipitation of the noble metal, alloy particles can be stably produced in the presence of an adsorbent. As the adsorbent, a polymer and a surfactant can be preferably used.

Examples of the polymer include polyvinyl alcohol (PVA), poly(N-vinyl-2-pyrrolidone) (PVP), and gelatin. The polymer is especially preferably PVP.

The molecular weight of the polymer is preferably 20,000 to 60,000, and more preferably 30,000 to 50,000. The amount of the polymer is preferably 0.1 to 10 times, and more preferably 0.1 to 5 times as large as the weight of the alloy particles to be produced.

The surfactant preferably used as the adsorbent preferably contains "an organic stabilizer", which is a long chain organic compound represented by Formula: R—X. In the formula, R denotes "a tail group", which is a linear or branched hydrocarbon or fluorocarbon chain and generally contains 8 to 22 carbon atoms. X represents "a head group", which is a portion (X) giving a specified chemical bond to the surfaces of the alloy particles and is preferably selected from a sulfinate group (—SOOH), a sulfonate group (—SO$_2$OH), a phosphinate group (—POOH), a phosphonate group (—OPO(OH)$_2$), a carboxylate group, and a thiol group.

The organic stabilizer is preferably selected from sulfonic acid (R—SO$_2$OH), sulfinic acid (R—SOOH), phosphinic acid (R$_2$POOH), phosphonic acid (R—OPO(OH)$_2$), carboxylic acid (R—COOH), and thiol (R—SH). As in the reverse micelle method, the organic stabilizer is especially preferably oleic acid.

The combination of phosphine and the organic stabilizer (e.g. triorganophosphine/acid) can provide excellent controllability over the growth and stabilization of the particles. Although didecyl ether and didodecyl ether can be used, phenyl ether and n-octyl ether can be used preferably as a solvent due to their low costs and their high boiling points.

The reaction is carried out preferably in the range of 80° C. to 360° C., and more preferably in the range of 80° C. to 240° C., depending on the required alloy particles and the boiling point of the solvent. The particles do not grow in some cases, if the temperature is lower than the temperature range. If the temperature is higher than the range, the particles grow without control and undesirable by-products may grow in some cases.

As in the reverse micelle method, the size of the alloy particles is preferably 1 to 100 nm, more preferably 3 to 20 nm, and still more preferably 3 to 10 nm.

A seed crystallization method is effective as a method for increasing the particle size (the particle diameter). When the alloy particles are used in a magnetic recording medium, the alloy particles are preferably packed in the closest packing state in order to increase recording capacity. In order to achieve the closest packing state, the standard deviation of the size of the alloy particles is preferably less than 10%, and more preferably 5% or less. The variation coefficient of the particle size is preferably less than 10%, and more preferably 5% or less.

If the particle size is too small, the alloy particles become superparamagnetic and this phenomenon is not preferable. Therefore, in order to enlarge the particle size, the seed crystallization method is preferably conducted as described above. In the process of the seed crystallization, a metal having higher redox potential than the metals composing the particles sometimes precipitates. In such a case, the particles may be undesirably oxidized. In order to prevent this, the particles are preferably hydrogenated prior to the seed crystallization.

It is preferable for a noble metal to form the outermost layer of the alloy particles from the viewpoint of oxidation prevention. However, particles having an outermost layer composed of a noble metal flocculate easily. In the invention, the outermost layer is preferably made of an alloy of a noble metal and a base metal. Particles having such a configuration can be formed easily and efficiently by a liquid-phase method.

Removal of salts from the solution after the alloy particle synthesis is preferable in terms of improvement in the dispersion stability of the alloy particles. One example of a method for removing the salts is as follows. An alcohol is excessively added to the solution to cause particles to slightly flocculate, and then to spontaneously or centrifugally precipitate. Thereafter, the salts are removed together with the supernatant solution. However, such a method easily causes flocculation. Hence, an ultra filtration method is preferably conducted as a method for removing the salts. Thus, the alloy particles dispersed in a solution (an alloy particle-containing solution) can be obtained.

A transmission electron microscope (TEM) may be employed to measure the size of the alloy particles. Electron diffraction by TEM can be employed to determine the crystal system of the alloy particles or the magnetic particles. However, x-ray diffraction is preferably employed, since it has high precision. To analyze the inner composition of the alloy particles or the magnetic particles, FE-TEM equipped with EDAX which emits a convergent electron beam, may be preferably employed. Further, evaluation of the magnetic properties of the alloy particles or the magnetic particles can be carried out using VSM.

<Oxidation Step>

By oxidizing the thus-obtained alloy particles, magnetic particles with hard magnetism can be efficiently produced without raising the temperature at the time of subsequent annealing in a non-oxidizing atmosphere. The reason for this is thought to be as follows.

That is, at first, by oxidizing the alloy particles, oxygen enters the crystal lattice of the alloy particles. When the alloy particles whose crystal lattice oxygen has entered is annealed, heat causes oxygen to leave the crystal lattice. Defects occur due to the leaving of oxygen. Since the metal atoms of the alloy easily move due to the defects, phase transformation occurs easily even at a relatively low temperature.

Such a phenomenon can be supported by measuring the EXAFS (Expanded range X-ray Absorption Fine Structure) of the alloy particles after the oxidation and the magnetic particles subjected to the annealing.

For example, in Fe—Pt alloy particles which have not been oxidized, a bond between an Fe atom and a Pt atom and a bond between Fe atoms can be confirmed.

Contrarily, in oxidized alloy particles, a bond between an Fe atom and an oxygen atom can be confirmed. However, a bond between an Fe atom and a Pt atom and that between Fe atoms are hardly found. This means the bond between an Fe atom and a Pt atom and that between Fe atoms are cut by oxygen atoms. It is thought that this causes Pt atoms and Fe atoms to easily move at the time of annealing.

After the alloy particles have been annealed, existence of oxygen cannot be confirmed and existence of a bond between an Fe atom and a Pt atom and that between Fe atoms can be confirmed around the Fe atom.

Taking the above-mentioned phenomenon into consideration, it can be understood that the progress of the phase transformation of non-oxidized alloy particles is more difficult than that of oxidized alloy particles and that the annealing temperature for the non-oxidized alloy particles should be higher than that for the oxidized alloy particles. However, if the alloy particles are excessively oxidized, interaction between oxygen and a metal that is easy to oxidize, such as Fe, becomes so strong as to produce a metal oxide.

Accordingly, control of the oxidation state of the alloy particles is important and therefore, it is necessary to oxidize the alloy particles under optimum conditions.

When the alloy particles are produced by the liquid phase method described above, the alloy particles can be oxidized, for example, by supplying a gas containing at least oxygen to the produced alloy particle-containing solution.

The proportion of the partial pressure of oxygen to the total pressure is preferably 10 to 100%, and more preferably 15 to 50%.

The oxidation temperature is preferably 0 to 100° C., and more preferably 15 to 80° C.

The oxidation state of the alloy particles is preferably evaluated by EXAFS. The number of bonds of a base metal such as Fe with oxygen is preferably 0.5 to 4, and more preferably 1 to 3, from the viewpoint of oxygen cutting Fe—Fe bonds and Pt—Fe bonds.

Further, the alloy particles which have been applied to or fixed on a support can be oxidized at room temperature (0 to 40° C.) in the air (while the support is exposed to the air). Oxidation of the alloy particles applied to the support prevents the alloy particles from flocculating. The oxidation time is preferably 1 to 48 hours, and more preferably 3 to 24 hours.

<Annealing Treatment>

The oxidized alloy particles have a disordered phase. The alloy particles having a disordered phase cannot attain hard magnetization as described above. Therefore, in order to convert the phase of the alloy particles to an ordered phase, it is necessary to heat (anneal) the alloy particles. The transformation temperature, at which the alloy of the alloy particles transforms from a disordered state to an ordered state, can be obtained by using a differential thermal analyzer (DTA). It is necessary to carry out the heating treatment at a temperature equal to or higher than the obtained transformation temperature.

The transformation temperature is generally about 500° C.; however, it is sometimes lowered by adding a third element to the alloy particles. Further, the transformation temperature can also be lowered by properly changing atmospheres at the time of oxidation and annealing. Accordingly, the annealing temperature is preferably adjusted to 150° C. or higher, and more preferably 150 to 450° C.

Representative magnetic recording media are a magnetic recording tape and a flexible disk. They are produced by forming a magnetic layer in a web state on a support made of an organic substance, and then cutting the resultant into tapes for the former or punching the resultant into disks for the latter. The invention is effective when an organic support is used. This is because the transformation temperature at the time that the alloy particles are made to be ferromagnetic can be lowered. Thus, the invention can be preferably applied to media having an organic support.

When the alloy is annealed in a web state, the annealing time is preferably short. This is because long annealing time requires a large annealing apparatus. For example, when the annealing time is set at 30 minutes and the transportation speed of the web is set at 50 m/min, the length of the apparatus becomes 1,500 m. Therefore, in the method of producing magnetic particles of the invention, the annealing time is preferably 10 minutes or shorter, and more preferably 5 minutes or shorter.

In order to shorten the annealing time as described above, the annealing is preferably conducted at a reducing atmosphere as described later. Such annealing is effective in preventing deformation of the support and diffusion of impurities from the support.

If the alloy in a particle state is annealed, the particles easily move and fuse. Therefore, a high coercive force can be obtained, but the annealed particles tend to have an undesirably large size. Accordingly, it is preferable to anneal the alloy particles which have been applied to a support in view of preventing flocculation of the alloy particles.

Further, by annealing alloy particles on a support to convert them into magnetic particles, a magnetic recording medium having a magnetic layer containing the magnetic particles can be obtained.

The support can be an inorganic or organic support, as long as it can be used in a magnetic recording medium.

The material of the inorganic support can be Al, an Mg alloy such as Al—Mg, or Mg—Al—Zn, glass, quartz, carbon, silicon, or ceramic. Such support has excellent impact resistance and rigidity suitable for thinning and high-speed rotation of the support. Further, the inorganic support is more resistant to heat than a support made of an organic material.

The material of the organic support can be polyester such as polyethylene terephthalate, or polyethylene naphthalate; polyolefin; cellulose triacetate; polycarbonate; polyamide (including aliphatic polyamide and aromatic polyamide such as aramide); polyimide; polyamideimide; polysulfone; or polybenzoxazole.

To apply the alloy particles to a support, a variety of additives are added, if necessary, to a solution containing the oxidized alloy particles and the resultant mixture is applied to the support.

The content of the alloy particles is preferably a desired concentration in a range of 0.01 to 0.1 mg/ml.

As a method for applying the alloy particles to a support, air doctor coat, blade coat, rod coat, extrusion coat, air knife coat, squeezing coat, impregnation coat, reverse roll coat, transfer roll coat, gravure coat, kiss coat, cast coat, spray coat, and spin coat can be employed.

The atmosphere at the time of annealing should be a non-oxidizing atmosphere, such as $H_2$, $N_2$, Ar, He, or Ne in order to efficiently promote phase transformation and prevent oxidation of the alloys.

In particular, in order to make oxygen existing in the lattice due to oxidation leave the lattice, the annealing is conducted preferably in a reducing atmosphere, such as methane, ethane, or $H_2$. Further, in terms of particle diameter retention, annealing is preferably carried out in a magnetic field under the reducing atmosphere. When $H_2$ atmosphere is employed, an inert gas is preferably added to the atmosphere to prevent explosion.

Further, in order to prevent the particles from fusing at the time of annealing, the particles are preferably annealed at a temperature equal to or lower than the transformation temperature in an inert gas to carbonize a dispersant and then annealed at a temperature equal to or higher than the transformation temperature in a reducing atmosphere. In this case, it is most preferable that the particles are annealed at a temperature equal to or lower than the transformation temperature, and that a Si-containing resin is applied to a layer of the alloy particles, and that the particles are then annealed at a temperature equal to or higher than the transformation temperature.

By carrying out the annealing described above, the alloy particles are transformed from a disordered phase to an ordered phase and magnetic particles exhibiting hard magnetism can be obtained.

Magnetic particles produced by the above-mentioned method of producing magnetic particles of the invention preferably have a coercive force of 95.5 to 398 kA/m (1,200 to 5,000 Oe). When they are used in a magnetic recording medium, more preferably they have a coercive force of 95.5 to 278.6 kA/m (1,200 to 3,500 Oe) in consideration of suitability for a recording head.

Further, the diameter of the magnetic particles is preferably 1 to 100 nm, more preferably 3 to 20 nm, and still more preferably 3 to 10 nm.

A second method of producing magnetic particles according to the invention includes steps of forming on a support a layer containing alloy particles that can form a CuAu-type or $Cu_3Au$-type hard magnetic ordered alloy phase, oxidizing the alloy particles, and then annealing them in a non-oxidizing atmosphere.

The production method includes some common points with the above-mentioned first method of producing magnetic particles. However, it differs from the first method in that magnetic particles are produced by directly depositing alloy particles on a support, and oxidizing and annealing them.

As the deposition method, any method which can deposit desired alloy particles on a support and form a layer containing the alloy particles can be employed without limitation. The deposition method is preferably a sputtering film formation method.

Examples of the sputtering film formation method include "RF magnetron sputtering method (hereinafter, sometimes referred to as "RF sputtering method"), and "DC magnetron sputtering method". Any of them can be employed. However, the sputtering film formation method is preferably the "RF sputtering method", since it can efficiently form alloy particles that can form a CuAu-type or $Cu_3Au$-type hard magnetic ordered alloy phase.

Segregation of Si, or Cr in crystal grain boundaries is preferable to lessen a magnetization unit and suppress noise.

The CuAu-type or $Cu_3Au$-type ordered alloy film formed by sputtering is paramagnetic or soft magnetic and becomes hard magnetic by annealing. In this case, annealing the alloy particles in a non-oxidizing atmosphere, preferably in a reducing atmosphere, after the particles have been oxidized is effective to lower the transformation temperature.

The formed film is preferably oxidized by a method similar to that used in the first production method, in which oxidation is carried out in the air.

The oxidized alloy particle is annealed under the same conditions as those of the first production method to obtain magnetic particles having hard magnetism.

<<Magnetic Recording Medium>>

A magnetic recording medium of the invention has a magnetic layer containing magnetic particles which are produced by the method of producing magnetic particles of the invention described above.

Examples of the magnetic recording medium include a magnetic tape such as a video tape, and a computer tape; and a magnetic disk such as a flexible disk, and a hard disk.

When alloy particles (an alloy particle-containing solution) are applied to a support and annealed to obtain magnetic particles as described above, a layer containing such magnetic particles can be a magnetic layer.

Further, in a case where alloy particles are annealed in a particle state to produce magnetic particles rather than being applied to a support for annealing, a coating solution is prepared by kneading the magnetic particles with an open kneader, or a three-roll mill and then finely dispersing the magnetic particles with a sand grinder. Thereafter, the coating solution is applied to a support by a known method to form a magnetic layer.

Further as described in "the second method of producing magnetic particles according to the invention", the magnetic recording medium may be produced by forming on a support a layer containing an alloy that can form a CuAu-type or $Cu_3Au$-type hard magnetic ordered alloy phase by a sputtering film formation method, oxidizing the alloy, and annealing the alloy in a non-oxidizing atmosphere to form a magnetic layer.

In this case, the alloy can be oxidized at room temperature (0 to 40° C.) in the air. Further, the annealing is preferably carried out in the manner as described in "the first method of producing magnetic particles according to the present invention".

Although the thickness of the magnetic layer to be formed depends on the type of a magnetic recording medium, the thickness is preferably 4 nm to 1 μm, and more preferably 4 nm to 100 nm.

The magnetic recording medium of the invention may have any other layer, if necessary, in addition to the magnetic layer. For example, in a case of a disk, another magnetic layer or a non-magnetic layer is preferably formed on a surface of the support which surface is opposite to a surface of the support having the above-described magnetic layer thereon. In a case of a tape, a back layer is preferably formed on a surface of an insoluble support which surface is opposite to a surface of the support having the magnetic layer thereon.

Further, wear resistance of the magnetic recording medium is improved by forming an extremely thin protection film on the magnetic layer. Moreover, the sliding property of the magnetic recording medium is improved by coating the protection film with a lubricant. These can provide a magnetic recording medium having sufficiently high reliability.

Examples of the material of the protection film include oxides such as silica, alumina, titania, zirconia, cobalt oxide, and nickel oxide; nitrides such as titanium nitride, silicon nitride, and boron nitride; carbides such as silicon carbide, chromium carbide, and boron carbide; and carbon such as graphite, and amorphous carbon. The material is especially preferably a hard amorphous carbon, so-called diamond-like carbon.

The carbon protection film composed of carbon is an extremely thin film having sufficient wear resistance, scarcely causes baking on a sliding member, and is therefore suitable as a protection film.

A method for forming a carbon protection film is generally a sputtering method in a case of a hard disk. In a case of products which require continuous film formation, such as a video tape, many methods employing plasma CVD with a higher film formation rate have been proposed, and these methods are preferably employed.

It has been reported that a plasma injection CVD (PI-CVD) method has an extremely high film formation rate and is capable of providing a carbon protection film which is hard, and has few pin holes and good quality (for example, JP-A Nos. 61-130487, 63-279426 and 3-113824).

The carbon protection film preferably has Vickers hardness of 1,000 kg/mm$^2$ or higher, and more preferably 2,000 kg/mm$^2$. Further, its crystal is preferably amorphous. Moreover, the protection film is preferably non-conductive.

When a diamond-like carbon film is used as a carbon protection film, it can be identified by Raman spectroscopic analysis. That is, when the spectrum of the diamond-like carbon film is measured by the Raman spectroscopic analysis, a peak appears in a range of 1,520 to 1,560 cm$^{-1}$, which shows that the measured film is a diamond-like carbon film. If the structure of the carbon film deviates from the diamond-like structure, the peak detected by the Raman spectrometry deviates from the foregoing range and the hardness of the protection film is lowered.

As a carbon raw material for forming the carbon protection film, carbon-containing compounds, for example, alkanes such as methane, ethane, propane, and butane; alkenes such as ethylene, and propylene; and alkynes such as acetylene are preferably used. Further, if necessary, a carrier gas such as argon and an addition gas for improving film quality such as hydrogen, and nitrogen may be added to the carbon raw material.

If the thickness of the carbon protection film is thick, electromagnetic conversion property deteriorates and adhesion between the protection film and the magnetic layer decreases. If the film thickness is thin, wear resistance of the protection film becomes insufficient. Accordingly, the film thickness is preferably 2.5 to 20 nm, and more preferably 5 to 10 nm.

Further, in order to improve adhesion between the protection film and the magnetic layer, it is preferable to previously etch the surface of the magnetic layer with an inert gas or to modify the surface by exposing the magnetic layer to reactive gas plasma such as oxygen plasma.

The magnetic layer may have a layered structure to improve the electromagnetic conversion property thereof, or a known non-magnetic underlayer and an intermediate layer may be disposed under the magnetic layer. In order to improve the running durability and corrosion resistance of the magnetic recording medium, a lubricant or a rust-preventing agent is preferably supplied to the magnetic layer or the protection film, as described above. As the lubricant to be supplied, known hydrocarbon lubricants, fluorinated lubricants, and extreme-pressure agents can be used.

Examples of the hydrocarbon lubricants include carboxylic acids such as stearic acid, and oleic acid; esters such as butyl stearate; sulfonic acids such as octadecylsulfonic acid; phosphoric acid esters such as monooctadecyl phosphate; alcohols such as stearyl alcohol, and oleyl alcohol; carboxylic acid amides such as stearic acid amide; and amines such as stearylamine.

Examples of the fluorinated lubricants include lubricants obtained by substituting some or all of the alkyl groups of the hydrocarbon lubricants with fluoroalkyl groups or perfluoropolyether groups.

Examples of the perfluoroether groups include perfluoromethylene oxide polymers, perfluoroethylene oxide polymers, perfluoro-n-propylene oxide polymers $(CF_2CF_2CF_2 O)_n$, perfluoroisopropylene oxide polymers $(CF(CF_3)CF_2 O)_n$, and their copolymers.

Further, compounds which are hydrocarbon lubricants having polar functional groups such as hydroxyl groups, ester groups, and carboxyl groups in the terminals of the alkyl groups and in the molecule thereof are effective for lowering friction force, and are also preferably used.

The molecular weight of each of them are preferably 500 to 5,000, and more preferably 1,000 to 3,000. If it is less than 500, volatility of the compound becomes high and lubricating property thereof becomes low in some cases. Further, if it exceeds 5,000, viscosity of the compound becomes high, and therefore a slider and a disk easily stick to each other, causing occurrence of running stoppage and head crash.

Examples of commercially available perfluoropolyether include FOMBLIN manufactured by Ausimont K.K., and KRYTOX manufactured by Du Pont K.K.

Examples of the extreme-pressure agents include phosphoric acid esters such as trilauryl phosphate; phosphorous acid esters such as trilauryl phosphate; thiophosphorous acid esters such as trilauryl trithiophosphite; thiophosphoric acid ester; and sulfur-containing extreme-pressure agents such as dibenzyl disulfide.

One of these lubricants can be used, or two or more of them can be used together. A method for supplying the lubricant to the magnetic layer or the protection film may involve steps of dissolving such a lubricant in an organic solvent and applying the resultant solution to the layer by a wire bar method, a gravure method, a spin coat method, or a dip coat method, or depositing the lubricant on the layer by vacuum evaporation.

Examples of the rust-preventing agents include nitrogen-containing heterocyclic compounds such as benzotriazole, benzimidazole, purine, and pyrimidine, and derivatives thereof obtained by introducing alkyl side chains into the mother cores of them; and nitrogen- and sulfur-containing heterocyclic compounds such as benzothiazole, 2-mercaptobenzothiazole, tetrazaindene cyclic compounds, and thiouracyl compounds and derivatives thereof.

As described above, when the magnetic recording medium is a magnetic tape, a back coat layer (a backing layer) may be formed on a surface of a non-magnetic support where the magnetic layer is not formed. The back coat layer is a layer formed by dispersing granular components such as an abrasive and an antistatic agent, and a binder in a known organic solvent, applying the resultant coating material for a back coat layer to the surface of the non-magnetic support where the magnetic layer is not formed.

As the granular components, a variety of inorganic pigments and carbon black may be used. Moreover, as the binder, nitrocellulose, phenoxy resin, vinyl chloride-based resin, and polyurethane type resin may be used. One of these materials may be used, or two or more of them can be used together.

Further, a known adhesive layer may be formed on a surface of a support to which surface an alloy particle-containing solution will be applied and another surface of the support on which surface a back coat layer will be formed.

The surface of the magnetic recording medium thus produced preferably has a center line average height in the range of 0.1 to 5 nm, and more preferably 1 to 4 nm at a cut-off value of 0.25. This is because it is preferable for a magnetic recording medium for high density recording to have an extremely smooth surface as described above.

A method for obtaining such a surface can be a method for carrying out calendering treatment after the magnetic layer formation. Further, varnishing treatment may be carried out.

The obtained magnetic recording medium may be properly punched out with a punching apparatus, or cut into pieces having a desired size with a cutting machine, and used.

EXAMPLES

Hereinafter, the present invention will be described in detail while referring to examples. However, the invention is not limited to these examples.

Example 1

Production of FePt Alloy Particle

The following steps were carried out in highly pure $N_2$ gas.

A reverse micelle solution (I) was prepared by mixing an alkane solution containing 10.8 g of Aerosol OT (produced by Wako Pure Chemical Industries, Ltd.), 80 ml of decane (produced by Wako Pure Chemical Industries, Ltd.), and 2 ml of oleylamine (produced by Tokyo Kasei Kogyo Co., Ltd.) with an aqueous reducing agent solution in which 0.76 g of $NaBH_4$ (produced by Wako Pure Chemical Industries, Ltd.) was dissolved in 16 ml of water (degree of deoxygenation: 0.1 mg/L or lower).

A reverse micelle solution (II) was prepared by mixing an alkane solution containing 5.4 g of Aerosol OT and 40 ml of decane with an aqueous metal salt solution in which 0.46 g of iron triammonium trioxalate $(Fe(NH_4)_3(C_2O_4)_3)$ (produced by Wako Pure Chemical Industries, Ltd.) and 0.38 g of potassium chloroplatinate $(K_2PtCl_4)$ (produced by Wako Pure Chemical Industries, Ltd.) were dissolved in 12 ml of deoxygenated water.

The reverse micelle solution (II) was added instantaneously to the reverse micelle solution (I), which was being stirred at 22° C. at a high speed with Omni mixer (manufactured by Yamato Scientific Co., Ltd.). Ten minutes later, the resultant mixture, which was being stirred with a magnetic stirrer, was heated to 50° C. and aged for 60 minutes.

After 2 ml of oleic acid (produced by Wako Pure Chemical Industries, Ltd.) was mixed with the mixture, the resultant mixture was cooled down to room temperature. After the cooling, the mixture was taken and put in the atmosphere. In order to break the reverse micelle, a mixed solution of 100 ml water and 100 ml of methanol was added to the mixture, and the resultant separated into a water phase and an oil phase. Alloy particles were dispersed in the oil phase. The oil phase was washed 5 times with a mixed solution of 600 ml of water and 200 ml of methanol.

Thereafter, 1,100 ml of methanol was added to the oil phase so as to cause the alloy particles to flocculate and precipitate. After the supernatant was removed, 20 ml of heptane (manufactured by Wako Pure Chemical Industries, Ltd.) was added to the residue to disperse the particles in the heptane.

Further, precipitation by adding 100 ml of methanol to the residue and dispersion using 20 ml of heptane and following the precipitation, were repeated twice. Finally, 5 ml of heptane was added to prepare an alloy metal-containing solution containing FePt alloy particles and having a mass ratio of water to the surfactant of 2:1.

The yield, composition, volume average particle diameter, and distribution (variation coefficient) of the obtained alloy particles were measured, and the following results were obtained.

The composition and yield were measured by ICP mass spectrometry (Inductively Coupled Plasma spectrometry).

The volume average particle diameter and distribution were calculated by photographing the particles with TEM (Transmission Electron Microscope) manufactured by Hitachi Ltd. (30 kV), measuring those of the obtained images and statistically processing the measured data.

The alloy particles used in the measurement were alloy particles collected from the produced alloy particle solution, sufficiently dried, and heated in an electric furnace.

Composition: FePt alloy with Pt content of 44.5 at %

Yield: 85%

Average particle diameter: 4.2 nm

Variation coefficient: 5%

Oxidation

The alloy particle-containing solution was concentrated in a reactor, while vacuum degassing of the reactor was carried out. Thus, the concentration of the alloy particles was adjusted to 4% by weight. After the concentration, the internal pressure of the reactor was turned back to normal pressure. Then, in order to oxidize the alloy particles, oxygen gas was supplied to the alloy particle-containing solution. The solvent which had evaporated from the solution at the time of oxidation was compensated by adding heptane to the solution. After the oxidation, oleylamine was added to the solution so that the amount of the oleylamine was 0.04 ml per ml of the alloy particle-containing solution.

Annealing

The surface of a Si support having a thickness of 1 mm was calcinated to convert Si in the surface portion, whose depth was 300 nm from the surface, into $SiO_2$. The alloy particle-containing solution after the oxidation was applied to the support with a spin coater. The coating amount was adjusted so that the amount of the alloy particles became 0.5 g/m².

After the coating, the support was heated to 550° C. in an electric furnace purged with $N_2$ gas at a programming rate of 50° C./minute and kept at 550° C. for 30 minutes. Then, the support was cooled at a temperature decreasing rate of 50° C./minute to room temperature. Thus, the alloy particles were annealed, and a magnetic layer having a thickness of 50 nm and containing the magnetic particles was formed, and a magnetic recording medium was produced.

The flow rate of the $N_2$ gas at the time of annealing was adjusted to 200 ml/minute. The oxidized alloy particles were subjected to EXAFS measurement, and the length of the bond between an Fe atom and an oxygen atom and the number of the bonds were found to be 19.7 nm and 2.2, respectively.

Example 2

A magnetic recording medium was produced in the same manner as in Example 1, except that a mixed gas of oxygen and nitrogen at a ratio of $O_2$ to $N_2$ of 1:1 was used in place of oxygen gas at the time of oxidation.

The oxidized alloy particles were subjected to EXAFS measurement, and the length of the bond between an Fe atom and an oxygen atom and the number of the bonds were found to be 19.8 nm and 1.8, respectively.

Example 3

A magnetic recording medium was produced in the same manner as in Example 1, except that air was used in place of oxygen gas at the time of oxidation.

The oxidized alloy particles were subjected to EXAFS measurement, and the length of the bond between an Fe atom and an oxygen atom and the number of the bonds were found to be 19.9 nm and 1.5, respectively.

Example 4

A magnetic recording medium was produced in the same manner as in Example 1, except that $H_2$ gas atmosphere was employed in place of $N_2$ gas atmosphere and the heating temperature was changed to 500° C. at the time of annealing.

The oxidized alloy particles were subjected to EXAFS measurement, and the length of the bond between an Fe atom and an oxygen atom and the number of the bonds were found to be 19.7 nm and 2.1, respectively.

Example 5

A magnetic recording medium was produced in the same manner as in Example 4, except that $H_2$ gas atmosphere was employed in place of $N_2$ gas atmosphere and the heating temperature was changed to 400° C. at the time of annealing.

Example 6

A magnetic recording medium was produced in the same manner as in Example 4, except that the heating temperature was changed to 450° C. at the time of annealing.

Example 7

A magnetic recording medium was produced in the same manner as in Example 6, except that the flow rate of $N_2$ gas was changed from 200 ml/minute to 600 ml/minute and the retention time at 450° C. was changed from 30 minutes to 10 minutes at the time of annealing.

Example 8

A magnetic recording medium was produced in the same manner as in Example 6, except that the flow rate of $N_2$ gas was changed from 200 ml/minute to 1,200 ml/minute and the retention time at 450° C. was changed from 30 minutes to 5 minutes at the time of annealing.

Comparative Example 1

A magnetic recording medium was produced in the same manner as in Example 1, except that nitrogen gas was used in place of oxygen gas at the time of oxidation.

Comparative Example 2

A magnetic recording medium was produced in the same manner as in Example 1, except that argon gas was used in place of oxygen gas at the time of oxidation.

Magnetic particles were scraped from the magnetic layer of each of the magnetic recording media of Examples 1 to 8 and Comparative Examples 1 and 2 with a spatula. The magnetic property, the volume average particle diameter, and the crystal structure thereof were evaluated. The results are shown in Table 1.

The measurement of the magnetic property (measurement of coercive force) was carried out by measuring the magnetic property of the magnetic layer formed on the support in an applied magnetic field of 790 kA/m (10 kOe) with a highly sensitive magnetization vector measurement apparatus and a DATA processing apparatus manufactured by Toei Industry Co., Ltd.

The previously mentioned TEM was used at an acceleration voltage of 300 kV to measure the volume average particle diameter.

The analysis of the crystal structure was carried out according to a powder method. In the method, an x-ray diffraction apparatus manufactured by Rigaku Corporation and a goniometer were used, the tube voltage was 50 kV, the tube current was 300 mA, and CuKα-rays were used as a radiation source.

TABLE 1

| | Introduced gas | After annealing | | |
|---|---|---|---|---|
| | | Volume average particle diameter (nm) | Coercive force (kA/m) | Crystal structure |
| Example 1 | Oxygen | 5 | 276.5 (3500 Oe) | Tetragonal FePt + hematite (partially) |
| Example 2 | Oxygen: nitrogen = 1:1 | 5 | 252.8 (3200 Oe) | Tetragonal FePt |
| Example 3 | Air | 5 | 260.7 (3300 Oe) | Tetragonal FePt |
| Example 4 | Oxygen | 5 | 387.1 (4900 Oe) | Tetragonal FePt |
| Example 5 | Oxygen | 5 | 250 (3165 Oe) | Tetragonal FePt |
| Example 6 | Oxygen | 5 | 355.5 (4500 Oe) | Tetragonal FePt |
| Example 7 | Oxygen | 5 | 347.6 (4400 Oe) | Tetragonal FePt |
| Example 8 | Oxygen | 5 | 331.8 (4200 Oe) | Tetragonal FePt |
| Comparative Example 1 | Nitrogen | 5 | 15.8 (200 Oe) | Cubic FePt |
| Comparative Example 2 | Argon | 5 | 14.22 (1800 Oe) | Cubic FePt |

Table 1 shows that the magnetic particles of Comparative Examples 1 and 2 still had cubic disordered phase and low coercive force (Hc), while the magnetic particles of the magnetic recording media of Examples 1 to 8 which magnetic particles had been oxidized had high coercive force.

The reason why the magnetic particles of the Examples had high coercive force was that the phase transformation temperature for the oxidized alloy particles was lower than that for the alloy particles of the Comparative Examples.

Further, the alloy particles of Examples 4 to 8 which had been annealed in hydrogen atmosphere had high coercive force (Hc), and the transformation temperature for these particles could be lower than that for the alloy particles of each of the other Examples. In particular, in Examples 7 and 8, the annealing time could be shortened.

Example 9

A layer containing alloy particles that could form a CuAu-type hard magnetic ordered alloy phase was formed on a support (quartz substrate) having a thickness of 1.25 mm by an RF sputtering method using a sputter target composed of an FePt alloy having an atomic composition ratio of Fe to Pt of 1:1.

The sputtering conditions were as follows:
Substrate temperature: 450° C.;
Sputtering gas pressure: 50 Pa; and
Distance between target and substrate: 95 mm.

After the layer was formed, the alloy particles were oxidized. The oxidation was carried out by leaving the layer formed on the support in air at room temperature (25° C.) for 6 hours (exposing it to air). Thereafter, the support was heated to 450° C. in an electric furnace purged with $H_2$ gas at a programming rate of 50° C./minute, kept at 450° C. for 30 minutes, and cooled down to room temperature at a temperature decreasing rate of 50° C./minute. Thus, the alloy particles were annealed, a magnetic layer having a thickness of 50 nm and containing the magnetic particles was formed, and a magnetic recording medium was produced.

Example 10

A layer containing alloy particles that could form a CuAu-type hard magnetic ordered alloy phase and having a thickness of about 30 nm was formed on a support by an RF sputtering method using a sputter target composed of an CoPt alloy having an atomic composition ratio of Co to Pt of 1:1. A quartz substrate (thickness: 1.25 mm) was used as the support. The sputtering conditions were the same as those in Example 9. The alloy particles were annealed in the same manner as in Example 9 to form a magnetic layer and to produce a magnetic recording medium.

Example 11

A magnetic recording medium was produced in the same manner as in Example 9, except that the atmosphere of the annealing was changed from $H_2$ gas to $N_2$ gas.

Example 12

A magnetic recording medium was produced in the same manner as in Example 10, except that the atmosphere of the annealing was changed from $H_2$ gas to $N_2$ gas.

Comparative Example 3

A magnetic recording medium was produced in the same manner as in Example 9, except that the alloy particles were not oxidized. Operation from completion of the sputtering to production of the magnetic recording medium was carried out under $N_2$ gas atmosphere to prevent the alloy particles from being oxidized.

Comparative Example 4

A magnetic recording medium was produced in the same manner as in Example 10, except that the alloy particles were not oxidized. Operation from completion of the sputtering to production of the magnetic recording medium was carried out under $N_2$ gas atmosphere to prevent the alloy particles from being oxidized.

The magnetic property of the magnetic layer formed on the support of each of the magnetic recording media of Examples 9 to 12 and Comparative Examples 3 and 4 was evaluated in the same manner as in Example 1. The results are shown in Table 2.

TABLE 2

| | | Annealing treatment | | Coercive force (kA/m) after |
|---|---|---|---|---|
| | Oxidation | Atmosphere | Temperature | annealing |
| Example 9 | Conducted | Hydrogen | 450° C. | 395 (5000 Oe) |
| Example 10 | Conducted | Hydrogen | 450° C. | 316 (4000 Oe) |
| Example 11 | Conducted | Nitrogen | 450° C. | 237 (3000 Oe) |
| Example 12 | Conducted | Nitrogen | 450° C. | 197.5 (2500 Oe) |
| Comparative Example 3 | Not Conducted | Nitrogen | 450° C. | 47.4 (600 Oe) |
| Comparative Example 4 | Not Conducted | Nitrogen | 450° C. | 39.5 (500 Oe) |

The magnetic recording media of Examples 9 to 12 including the alloy particles which had been oxidized had magnetic property (coercive force) higher than that of each of the magnetic recording media of Comparative Examples 3 and 4 including the alloy which had not been oxidized. Moreover, as shown in Examples 9 and 10, use of hydrogen atmosphere at the time of annealing can further improve the magnetic property and enables the treatment temperature to be kept at a low temperature.

As described above, the invention can provide a production method in which magnetic particles with hard magnetism can be produced without increasing the temperature at the time of annealing, a magnetic particle produced by the production method, and a magnetic recording medium having a magnetic layer containing the magnetic particles.

What is claimed is:

1. A method of producing a magnetic particle including producing an alloy particle that can form a CuAu-type or $Cu_3Au$-type hard magnetic ordered alloy phase, oxidizing the alloy particle with an oxygen-containing gas, and annealing the particle in a non-oxidizing atmosphere.

2. A method of producing a magnetic particle according to claim 1, wherein the atmosphere for the annealing is a reducing atmosphere, an annealing temperature is 450° C. or lower, and a retention time is 10 minutes or shorter.

3. A method of producing a magnetic particle according to claim 1, wherein a third element other than elements that can form the CuAu-type or $Cu_3Au$-type hard magnetic ordered alloy phase, is added to the alloy particle as an alloying element.

4. A method of producing a magnetic particle according to claim 1, which comprises producing the alloy particle by a liquid phase method.

5. A method of producing a magnetic particle according to claim 1, which comprises producing the alloy particle by a reverse micelle method.

* * * * *